United States Patent
Gaukel et al.

(10) Patent No.: US 7,568,543 B2
(45) Date of Patent: Aug. 4, 2009

(54) DEVICE FOR CONTROLLING RESTRAINING MEANS IN A VEHICLE

(75) Inventors: Harald Gaukel, Heilbronn (DE); Gerhard Loeckle, Ludwigsburg (DE); Volker Walz, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 10/532,414

(22) PCT Filed: Oct. 21, 2003

(86) PCT No.: PCT/DE03/03482
§ 371 (c)(1), (2), (4) Date: Apr. 22, 2005

(87) PCT Pub. No.: WO2004/078529
PCT Pub. Date: Sep. 16, 2004

(65) Prior Publication Data
US 2005/0269809 A1    Dec. 8, 2005

(30) Foreign Application Priority Data
Mar. 3, 2003    (DE) .................... 103 09 081

(51) Int. Cl.
*B60R 21/00* (2006.01)
(52) U.S. Cl. ............ 180/271; 180/282; 701/45
(58) Field of Classification Search ............ 180/268, 180/269, 270, 271, 282; 280/802, 801, 806, 280/734, 735; 701/46, 45, 36, 301, 71; 342/72, 342/107
See application file for complete search history.

(56) References Cited

U.S. PATENT DOCUMENTS

| | | | | |
|---|---|---|---|---|
| 4,178,016 A * | 12/1979 | Andres et al. | ............... | 180/282 |
| 4,460,962 A * | 7/1984 | Pape et al. | ............... | 701/71 |
| 5,014,810 A * | 5/1991 | Mattes et al. | ............... | 180/268 |
| 5,068,793 A * | 11/1991 | Condne et al. | ............... | 701/46 |
| 5,367,459 A * | 11/1994 | Shtarkman et al. | ............... | 701/37 |
| 5,949,366 A * | 9/1999 | Herrmann | ............... | 342/72 |
| 6,012,008 A * | 1/2000 | Scully | ............... | 701/45 |
| 6,169,945 B1 * | 1/2001 | Bachmaier | ............... | 701/45 |
| 6,315,372 B1 * | 11/2001 | Kroger et al. | ............... | 303/191 |
| 6,420,996 B1 * | 7/2002 | Stopczynski et al. | ............... | 342/70 |
| 6,526,342 B1 * | 2/2003 | Burdock et al. | ............... | 701/37 |
| 6,834,221 B2 * | 12/2004 | Jager et al. | ............... | 701/34 |
| 6,907,335 B2 * | 6/2005 | Oswald et al. | ............... | 701/45 |
| 7,121,376 B2 * | 10/2006 | Baumgartner et al. | ............... | 180/282 |
| 2004/0030497 A1 * | 2/2004 | Knoop et al. | ............... | 701/301 |
| 2004/0045760 A1 * | 3/2004 | Baumgartner et al. | ............... | 180/282 |
| 2005/0252708 A1 * | 11/2005 | Theisen | ............... | 180/268 |

FOREIGN PATENT DOCUMENTS

| | | |
|---|---|---|
| DE | 196 10 833 | 9/1996 |
| DE | 199 13 675 | 9/2000 |
| DE | 101 17 220 | 10/2002 |
| DE | 101 38 764 | 10/2002 |

(Continued)

*Primary Examiner*—Hau V Phan
(74) *Attorney, Agent, or Firm*—Kenyon & Kenyon LLP

(57) ABSTRACT

A device for triggering a restraining arrangement in a vehicle in which the vehicle velocity is taken into consideration in the triggering. In the system, the vehicle velocity is checked for plausibility by the signal from a remote sensor so as to avoid faulty triggering.

12 Claims, 3 Drawing Sheets

FOREIGN PATENT DOCUMENTS

| | | |
|---|---|---|
| JP | 2212238 | 8/1990 |
| JP | 2270656 | 11/1990 |
| JP | 5258186 | 10/1993 |
| JP | 11152010 | 6/1999 |
| JP | 2001294116 | 10/2001 |

* cited by examiner

DEVICE FOR CONTROLLING RESTRAINING MEANS IN A VEHICLE

BACKGROUND INFORMATION

German Patent Application No. DE 199 13 675 describes considering the vehicle speed in the triggering of restraining means.

This approach is disadvantageous insofar as the vehicle speed itself is not checked for plausibility.

SUMMARY OF THE INVENTION

The device for triggering restraining means in a motor vehicles according to the present invention has the advantage over the related art that the vehicle speed in the longitudinal vehicle direction (x-direction) or in the transverse vehicle direction (y-direction) is now itself subjected to a plausibility check by the signal from at least one remote sensor, prior to the vehicle speed being taken into account in the triggering of the restraining means and in particular in the generation of the trigger decision. This improves the reliability with respect to a faulty triggering that may occur when driving through potholes or driving across curbs at high speed, for instance. If a remote sensor is utilized for this purpose, this signal will indicate whether an actual collision has taken place, so that the trigger algorithm can then be made more sensitive as a function of the vehicle speed, i.e., is switched in a sharper (more restrictive) manner. This is normally accomplished either by adding an allowance to the crash signal or by lowering the amount of the trigger threshold. This makes it possible to generate an earlier trigger signal at high vehicle speeds when a serious crash is to be expected, thereby allowing the restraining means to be triggered more rapidly. The vehicle occupants are better protected by this measure.

In an advantageous manner, the remote sensor may be an up-front sensor and/or an acceleration sensor, which may also be installed in the side of the vehicle as a side-impact sensor, for example. The sensor may be sensitive in the driving direction, but additionally in the y-direction as well, i.e., in the transverse vehicle direction, or in the z-direction, i.e., in the vertical vehicle direction. The sensor(s) may also be arranged at an angle with respect to the x, y or z-direction. A pedestrian-impact sensor may also be utilized here, but also indirect deformation sensors such as pressure sensors or temperature sensors, which are installed in largely sealed cavities in the motor vehicle in order to measure a collision via an adiabatic pressure increase.

The vehicle speed may preferably be subdivided into classes, such as into four classes in order to then modify, on the basis of this classification, the threshold to which at least one crash signal is compared when generating the trigger decision. At high speeds, a high allowance will be added to the crash signal or the threshold is lowered correspondingly. A crash signal is understood here as a signal from a crash sensor such as an acceleration sensor or a pressure sensor. Other deformation sensors may also supply such a crash signal.

To generate the plausibility signal for the vehicle speed, the upfront sensor has its own plausibility threshold, which is considerably lower than a trigger threshold for generation of a crash signal. It is common practice to compare these thresholds to the signals from the upfront sensor in the central control unit. As an alternative, however, they may also be calculated in the upfront sensor itself, by a separate computer unit. These thresholds are able to be dynamically modified over time. Furthermore, more than one threshold may also be utilized. For the most optimal response to such faulty triggerings as they occur when crossing a curb or driving through a pothole, it is advantageous if the remote sensor exhibits sensitivity in the driving direction, i.e., the x-direction.

Two possibilities are provided here, in particular for plausibilization of the vehicle velocity: For one, a direct plausibility check via the result of the upfront algorithm when the threshold in the frontal algorithm is changed as a function of speed, i.e., the algorithm which is calculated for a frontal impact; and, on the other hand, an indirect plausibility check via a threshold change as a function of the vehicle velocity in the upfrontal algorithm, the upfrontal algorithm then acting on the frontal algorithm with respect to the threshold change in the frontal algorithm. In the second case an implicit plausibilization is thus achieved. If the upfront algorithm does not detect a threshold exceedance in a threshold that is changed by the vehicle velocity, this already provides plausibilization of the vehicle velocity.

In the first case, in a threshold that is not a function of the vehicle velocity, the upfront algorithm detects no exceedance of the threshold, thereby influencing a frontal algorithm that has experienced a threshold change as a function of the vehicle velocity, namely in such a way that faulty triggering (misuse) will not cause triggering. The threshold in the frontal algorithm is therefore not lowered.

DETAILED DESCRIPTION

Figure 1:
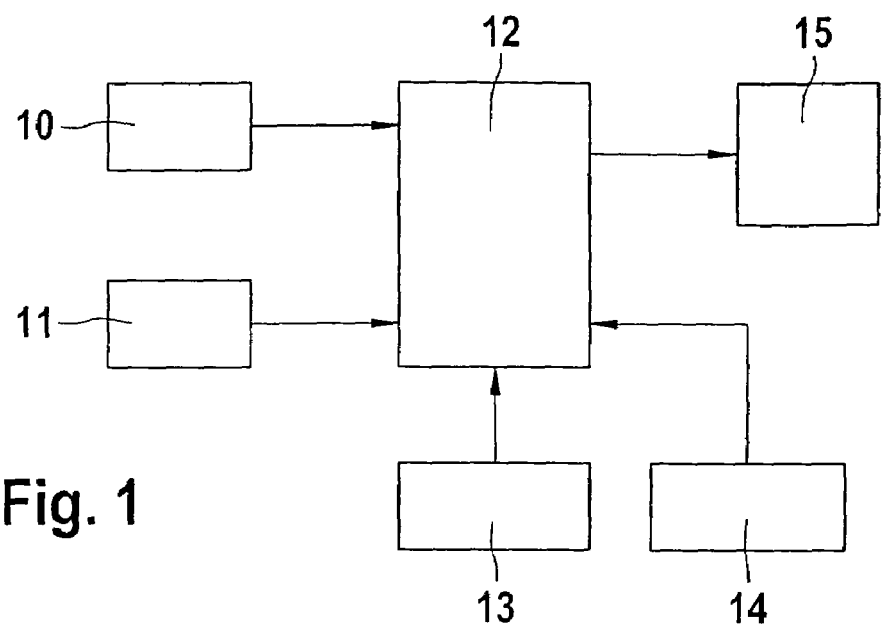
FIG. 1 shows a block diagram of the device according to the present invention.

An airbag control unit controls various restraining means according to a trigger algorithm on the basis of the type and severity of an accident, various sensors being utilized in the vehicle to this end. For one, there is the central control unit, which is located in the vehicle interior, for example on the tunnel underneath the radio, and which calculates the trigger algorithm on its own. This control unit collects sensor data from sensors at remote locations, the so-called upfront sensors, which are located on the vehicle radiator, for instance, and/or from side-impact sensors, which are arranged on the A, B or C column or in the side panels of the vehicle.

The upfront sensors, which are situated in the vehicle's crash crumple zone, influence the triggering of belt tighteners and front airbags. These sensors ensure that a crash of the offset-deformable barrier type (ODB) at a 40% offset and a velocity of 54 km/h is able to be distinguished from a so-called repair crash against a hard barrier at 16 km/h.

In view of more stringent demands that a 40 km/h ODB crash also be triggered early enough without jeopardizing the repair crash, new demands are placed on the sensor system.

To this end, it is provided that the vehicle velocity be taken into consideration as well. For instance, three to four different velocity classes are used to modify the trigger thresholds in different ways. However, this type of increased sensitization of the trigger algorithm, that is to say, a lowering of the trigger threshold as a function of the vehicle velocity, for example, is not without risk. This risk exists in particular when driving over a curb or through a pothole and a sensitized trigger algorithm then results due to high vehicle velocity, which in this case may lead to an undesired triggering of restraining means.

An additional plausibility check by the remote sensors is provided in this event in order to isolate such cases as driving through a pothole or driving over a curb.

With the aid of the vehicle velocity the trigger algorithm is thus able to be sensitized in addition. An adjustable value is added to or subtracted from the trigger thresholds for belt tighteners, airbag first stage and airbag second stage, or the trigger behavior is modified via a factor. Since this would also be the case in rapid, so-called misuse driving, i.e., faulty triggering, the vehicle velocity must be plausibilized by an additional remote sensor. This task may be assumed by one or both upfront sensor(s), for example. Here, an additional plausibility threshold to the integral of the acceleration signal from the upfront sensor may be introduced. This causes the trigger threshold to be changed only when corresponding acceleration signals are measured at the upfront sensor.

In misuse situations, however, for example when driving over a curb or driving through potholes, only slight acceleration signals occur at the upfront sensor. However, the plausibility could not only be provided by an upfront sensor, but also by any other external acceleration sensor, such as a side satellite having an x-measuring direction or a sensor for pedestrian protection. The plausibility threshold could in turn be adjusted to be more sensitive than the actual upfront thresholds for generating the trigger decision, and would therefore contribute to a trigger decision at an earlier point in time.

Here, a frontal algorithm denotes an algorithm on the basis of which the triggering of restraining means is determined in a front crash. This algorithm is calculated in the central control unit. Sensor signals from the control unit and from remote sensors are taken into account. An upfront algorithm is an algorithm which is also calculated in the central control unit, but only on the basis of sensor signals from the upfront sensors.

FIG. 1 shows the device according to the present invention in a block diagram. Two upfront sensors 10 and 11 are connected to data inputs of a control unit for restraining means 12. The data transmission from upfront sensors 10 and 11 is unidirectional in this case, i.e., upfront sensors 10 and 11 provide only the sensor data to control unit 12, which then carries out the evaluation on the basis of these sensor data. It is possible that upfront sensors 10 and 11 themselves already carry out a preliminary evaluation and then transmit only the result of this preliminary evaluation to control unit 12. Furthermore, there is the alternative of a bi-directional data connection being present between control unit 12 and sensors 10 and 11. In this case, polling is possible via a dialogue. A bus, which is able to interconnect control unit 12 and sensors 10 and 11, constitutes another alternative. In this case, a sensor bus is given. Furthermore, control unit 12 is connected to a side-impact sensor system 13 via a third data input. This side-impact sensory system may include acceleration sensors or pressure sensors as indirect deformation sensors. Here, too, a unidirectional connection is given, a sensor bus connection or a bi-directional connection being possible as an alternative as well. Via a fourth data input, control unit 12 is connected to a sensor system 14, which provides the vehicle velocity. This data may already be available in the CAN bus of the vehicle, for example. The vehicle velocity is obtained via a speedometer or the wheel-speed data or by an equivalent sensor system. Via a data output, control unit 12 is then connected to restraining means 15, which may include airbags, belt tighteners and roll bars, for instance. The airbags and belt tighteners may have multiple stages. The restraining means, too, may be connected to control unit 12 via a bus connection, which is then a so-called ignition bus.

As a rule, the utilized acceleration sensors are produced micromechanically, although other technologies may be utilized as well for the manufacture of these acceleration sensors. The acceleration sensors have their own measuring amplifiers, digitization and transmitter modules. If other data connections such as bus or bi-directional data connections are envisioned, corresponding bus controllers or transmitter/receiver modules must be provided.

With the aid of the external sensor systems, control unit 12 then calculates whether a trigger event has occurred and whether restraining means 15 should be triggered. Using the sensor signals, including those from sensors located in control unit 12, the crash direction is determined, i.e., the crash type and the severity of the crash. In addition, the vehicle velocity itself will then be taken into account here, too, the vehicle velocity being provided by sensor system 14. This vehicle velocity results in a sharpening of the trigger algorithm in that the thresholds are lowered or increased as a function of the vehicle velocity. To avoid unnecessary sensitization of the trigger algorithm in a misuse case such as driving over a curb or driving through a pothole at high speed, and in order to prevent faulty triggering in such cases, the present invention provides that the signal of upfront sensors 10 and 11 be considered in this change of the threshold value of the trigger algorithm. If no crash is indicated by the signals from these two sensors, the trigger threshold will not be modified. To generate this plausibility signal of upfront sensors 10 and 11, the signal from sensors 10 and 11 is compared to a plausibility threshold, which is lower than a trigger threshold that these signals must exceed to indicate a trigger case.

Figure 2:
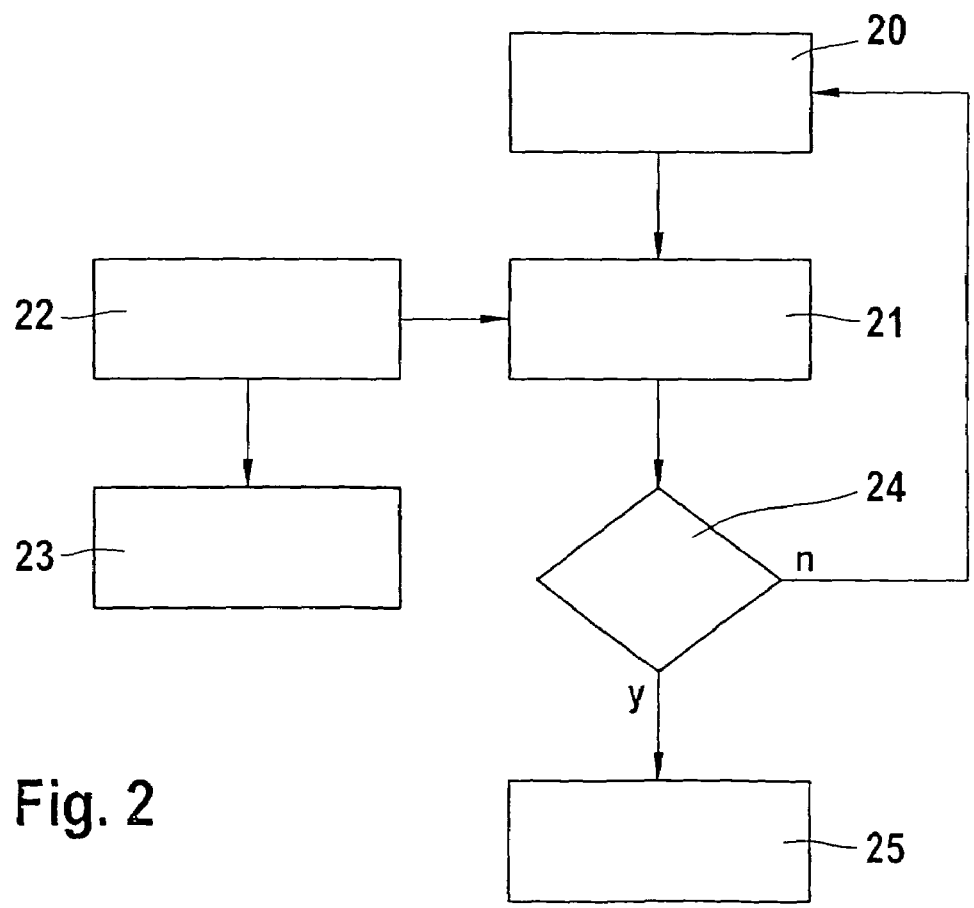
FIG. 2 shows a first flow chart.

FIG. 2 visualizes the method running in the device according to the present invention. In method step 20, a crash signal is generated by sensors 10, 11 and 13 and also by the sensors at control unit 12. In a method step 21, this crash signal is compared to a trigger threshold, which is dynamically changed over time. This threshold is modified here, however, in particular as a function of the vehicle velocity from method step 22. According to the present invention, the vehicle velocity is now additionally subjected to a plausibility check in method step 23, using the signal from sensors 10 and 11. If the signals from sensors 10 and 11 indicate that no crash but a non-trigger event has occurred, the threshold for the threshold comparison in method step 21 is left unchanged or is even increased. The result of this threshold comparison is then evaluated in method step 24. If the threshold has not been exceeded, no trigger event has occurred and a return to method step 20 takes place in order to continue checking the crash signal. As stated, the crash signal is generated by the crash sensors, the acceleration sensors and the deformation sensors. However, if a trigger event has been ascertained in method step 24, the appropriate trigger means will be triggered in method step 25 at the corresponding force as a function of the crash severity, the occupancy state and the crash type.

Figure 3:
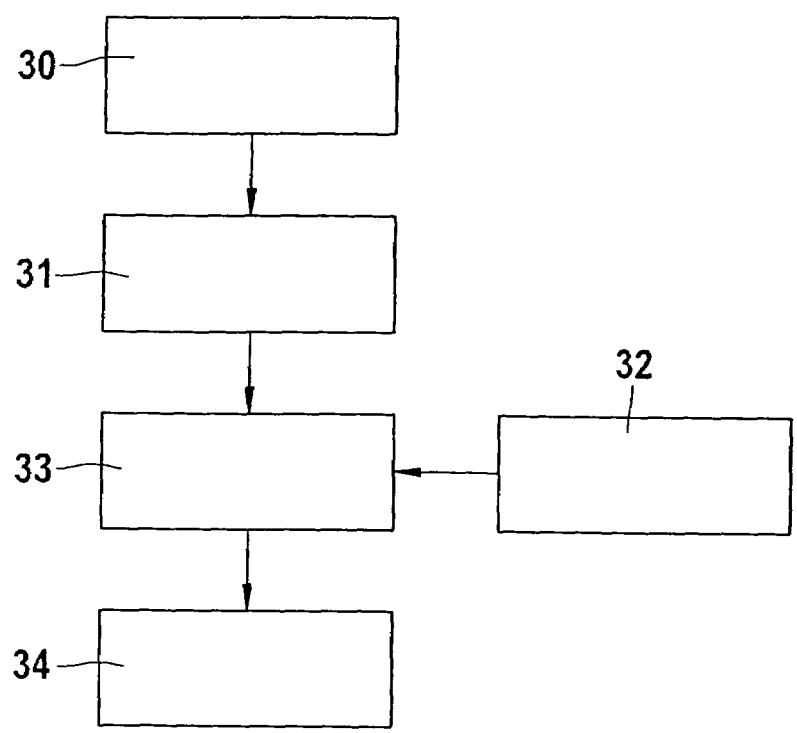
FIG. 3 shows a second flow chart.

FIG. 3 once again shows the detailed sequence of the plausibility check of the vehicle velocity. In method step 30, the vehicle velocity is provided by sensor system 14. In method step 31, the processor of control unit 12 performs a classification of this vehicle velocity. In method step 33, the threshold allowance is then determined as a function of class 31. However, here it is now additionally considered whether it was determined in method step 32 that such a case requiring a threshold modification, i.e., a threshold increase or decrease, exists in the first place. The then possibly modified threshold is supplied to the algorithm in method step 34.

Figure 4:
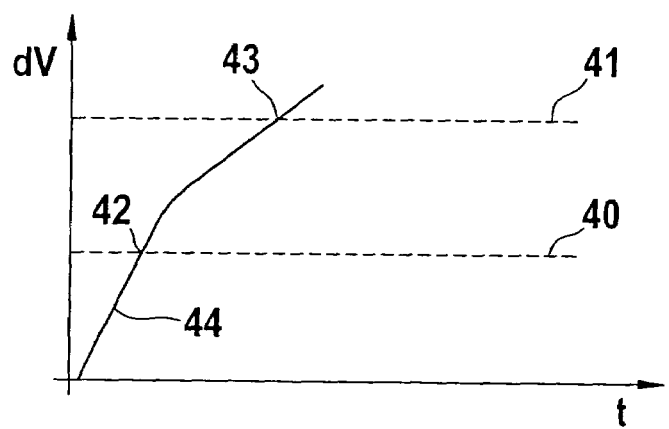
FIG. 4 shows a first dV/timing chart.

In a first dV/timing diagram, FIG. 4 shows a signal from an upfront sensor 10, 11 in comparison with a plausibility threshold 40 and a trigger threshold 41. FIG. 4 shows the time characteristic of signal 44. At instant 42 it exceeds plausibility threshold 40, so that it is indicated here to the algorithm that the vehicle velocity may lead to a sharpening of the algorithm and a triggering may therefore occur. In method step 43, trigger threshold 41 for the upfront sensor is then exceeded as well, which results in a sharpening of the algorithm independently of the vehicle velocity.

Figure 5:
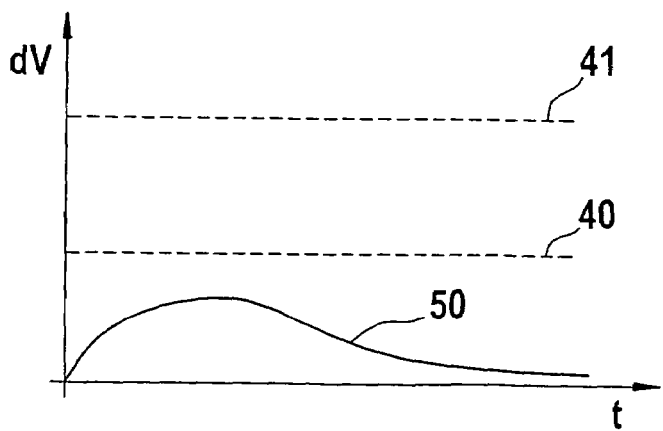
FIG. 5 shows a second dV/timing chart.

FIG. 5 shows a second dV/t diagram, which again shows thresholds 40 and 41. Signal 50, now generated by the upfront sensor, does not reach any of the thresholds during the examined time, so that the algorithm will not implement any threshold changes as a function of the vehicle velocity. It may even occur that the threshold is increased to switch the algorithm in a less sensitive manner, since it is possible that a trigger event such as crossing the curb or driving through a pothole has taken place.

Figure 6:
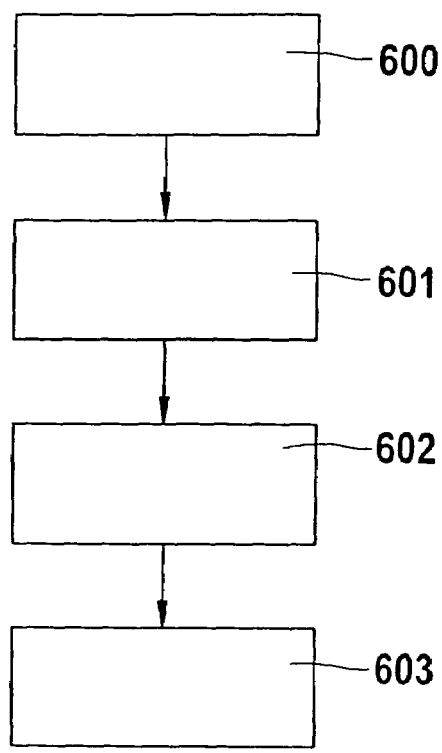
FIG. 6 shows a third flow chart.

FIG. 6 shows a third flow chart. In method step 600, the vehicle velocity is ascertained. In method step 601, the threshold for the upfront algorithm is lowered as a function thereof, in this way causing a sharpening of this algorithm. However, the result of the upfront algorithm acts on the front algorithm in method step 602, namely with respect to its threshold, so that a sharper upfront algorithm also leads to a corresponding lowering of the threshold of the frontal algorithm. The trigger decision will then be made on the basis of a frontal algorithm influenced in this manner. This results in an implicit plausibilization of the vehicle velocity since only when the upfront algorithm detects a threshold being exceeded and thus detects an impact, will the frontal algorithm be influenced by the upfront algorithm with respect to its threshold. As a result, misuse cases will not prompt even a sharpened upfront algorithm to a trigger decision and thus the frontal algorithm not either.

Figure 7:
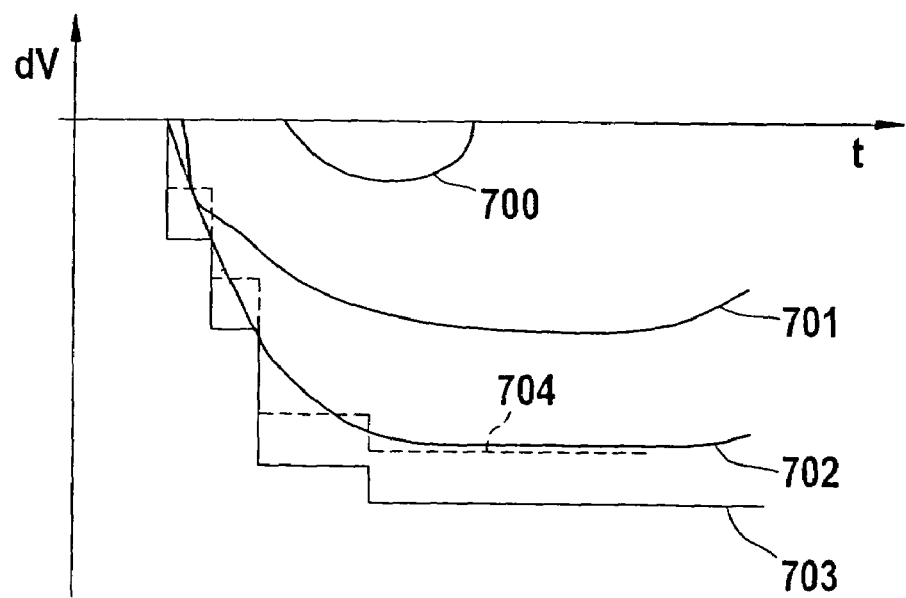
FIG. 7 shows a third dV/timing chart.

FIG. 7 illustrates the characteristic of the upfront algorithm in a third dV timing diagram. A threshold 703 of the upfront algorithm is changing as a function of time and the acceleration determined by the upfront sensor. This threshold 703 is lowered as a function of the vehicle's own velocity or the velocity class, so that threshold 704 is thus valid. But even this lowered threshold 704 will not cause a misuse case such as crossing the curb to result in a trigger decision, i.e., an exceeding of the threshold. The misuse case is represented here by curve 700. However, a 40 km/h ODB crash 701 does lead to a threshold being exceeded here. The velocity class according to which the threshold is lowered is that for 40 km/h. On the other hand, threshold 703 will not even identify a 15 km/h repair crash 702 as a trigger, i.e., threshold 703 represents a low vehicle velocity that corresponds to a 15/km repair crash.

What is claimed is:

1. A device for triggering a restraining device in a vehicle, comprising:
an arrangement for triggering the restraining device as a function of a velocity of the vehicle, the arrangement considering the vehicle velocity as a function of a signal from at least one remote sensor, wherein the velocity is provided by a sensor arrangement that determines the velocity, and wherein the remote sensor is used to perform a plausibility check for the velocity of the vehicle;
a modifying arrangement for modifying at least one threshold to which at least one crash signal is compared for the triggering of the restraining device, as a function of the vehicle velocity;
a subdividing arrangement for subdividing the vehicle velocity into a predefined class as a function of a magnitude of the vehicle velocity and then for modifying the threshold as a function of the class; and
a comparing arrangement for comparing the signal of the at least one remote sensor to a plausibility threshold, the plausibility threshold lying below a trigger threshold for generating a crash signal of the at least one remote sensor, the vehicle velocity being taken into consideration in the triggering of the restraining device as a function of the comparison.

2. The device according to claim 1, wherein the sensor is an acceleration sensor.

3. The device according to claim 1, further comprising: a modifying arrangement for modifying at least one threshold to which at least one crash signal is compared for the triggering of the restraining device, as a function of the vehicle velocity.

4. The device according to claim 3, further comprising: a subdividing arrangement for subdividing the vehicle velocity into a predefined class as a function of a magnitude of the vehicle velocity and then for modifying the threshold as a function of the class 5. The device according to claim 3, wherein the vehicle velocity leads to a modification of the threshold in a frontal algorithm.

6. The device according to claim 3, wherein the vehicle velocity leads to a modification of the threshold in an upfront algorithm.

7. The device according to claim 3, wherein the sensor arrangement includes a speedometer, and wherein the sensor arrangement determines the velocity based on wheel speed data.

8. The device according to claim 3, wherein the sensor arrangement includes a speedometer, and wherein the sensor arrangement determines the velocity based on wheel speed data.

9. The device according to claim 1, wherein the at least one remote sensor is an upfront sensor.

10. The device according to claim 1, wherein the sensor arrangement includes a speedometer.

11. The device according to claim 1, wherein the sensor arrangement determines the velocity based on wheel speed data.

12. The device according to claim 1, wherein the sensor arrangement includes a speedometer, and wherein the sensor arrangement determines the velocity based on wheel speed data.

* * * * *